US007112020B2

(12) United States Patent
Sheffler et al.

(10) Patent No.: US 7,112,020 B2
(45) Date of Patent: Sep. 26, 2006

(54) CUTTING TOOL CONFIGURED FOR IMPROVED ENGAGEMENT WITH A TOOL HOLDER

(75) Inventors: Glenn W. Sheffler, Blairsville, PA (US); Filho Ruy Frota de Souza, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/457,965

(22) Filed: Jun. 10, 2003

(65) Prior Publication Data

US 2004/0253070 A1    Dec. 16, 2004

(51) Int. Cl.
*B23C 5/00*    (2006.01)
(52) U.S. Cl. .................. 409/234; 408/226; 408/239 R; 279/83
(58) Field of Classification Search ................ 408/226, 408/239 R, 239 A, 233, 185, 197; 409/234, 409/232, 279; 279/83
See application file for complete search history.

(56) References Cited

U.S. PATENT DOCUMENTS

| 1,647,802 | A |   | 11/1927 | Josef |
| 2,073,430 | A |   | 3/1937  | Tautz |
| 2,362,053 | A | * | 11/1944 | Danielson ............... 408/233 |
| 2,416,285 | A | * | 2/1947  | Buckingham et al. ...... 403/361 |
| 3,320,833 | A | * | 5/1967  | Andreasson ............... 408/57 |
| 3,507,508 | A | * | 4/1970  | Andrews ................... 279/83 |
| 4,550,476 | A | * | 11/1985 | DeCaro ..................... 29/26 A |
| 4,575,292 | A | * | 3/1986  | Pape et al. ................ 409/234 |
| 4,647,052 | A | * | 3/1987  | Butikofer ................. 279/83 |
| 4,705,435 | A | * | 11/1987 | Christoffel ............... 408/59 |
| 4,877,360 | A |   | 10/1989 | Pfalzgraf |
| 5,026,224 | A | * | 6/1991  | Andersson et al. ....... 409/234 |
| 5,032,043 | A |   | 7/1991  | Hollifield |
| 5,163,790 | A | * | 11/1992 | Vig ........................... 408/57 |
| 5,402,696 | A | * | 4/1995  | Hecht et al. ............... 82/158 |
| 5,601,295 | A |   | 2/1997  | Baker |
| 5,683,212 | A |   | 11/1997 | Cirino et al. |
| 5,769,577 | A | * | 6/1998  | Boddy ....................... 408/231 |
| 5,873,682 | A | * | 2/1999  | Tripsa ....................... 407/101 |
| 6,299,180 | B1| * | 10/2001 | Satran et al. ............... 279/83 |
| 6,444,941 | B1|   | 9/2002  | Russo |
| 2006/0048615 | A1| * | 3/2006 | Treige ....................... 82/158 |

FOREIGN PATENT DOCUMENTS

DE    2848227 B  *  4/1980
EP    145985 A2  *  6/1985

* cited by examiner

*Primary Examiner*—Monica Carter
*Assistant Examiner*—Sara Addisu
(74) *Attorney, Agent, or Firm*—Larry R. Meenan

(57) ABSTRACT

A cutting tool has a shank with a cylindrical portion that is adapted to fit closely within a tool holder. The shank is adapted to be engaged by a setscrew of the tool holder at a first contact point. A clearance surface is provided opposite the first contact point. The clearance surface terminates adjacent two circumferentially spaced points that make contact with the tool holder upon tightening the setscrew. These contact points are circumferentially spaced from the first contact point angular distances greater than 90 degrees and less than 270 degrees.

6 Claims, 2 Drawing Sheets

CUTTING TOOL CONFIGURED FOR IMPROVED ENGAGEMENT WITH A TOOL HOLDER

FIELD OF THE INVENTION

The present invention relates to a cutting tool and, more particularly, to the cooperative engagement of a cutting tool and a tool holder. Most particularly, the invention relates to an improved cutting tool structure that cooperates with a tool holder to minimize vibration during a milling operation that results in chatter.

BACKGROUND OF THE INVENTION

Metal working machines are well known. A conventional metal working machine typically includes a power drive unit, such as an electric, hydraulic, or pneumatic motor; a suitable cutting tool, such as a drill, boring tool, probe or the like; and a tool holder for connecting the cutting tool to the power drive unit. The tool holder typically includes a socket or sleeve member, which is mounted directly to the power drive unit, and which is adapted to support the cutting tool in order to connect the cutting tool to the power drive unit.

A typical cutting tool has a cylindrical shank with a specific diameter that fits within a close tolerance in the sleeve member of the tool holder. The shank may be provided with a single flat, or multiple, usually two, axial aligned flats, which are typically machined along the peripheral surface of the shank. This type of shank is commonly referred to as a "Weldon Shank". The sleeve member supports a setscrew for each flat. The setscrews are adapted to be tightened against the flats. The force of each setscrew is transmitted to the shank, causing a portion of the shank, opposite (i.e., 180 degrees from) the flats, to meet or engage an inner surface of the sleeve member to secure the cutting tool therein.

The aforementioned tool and holder arrangement theoretically results in two points, or a single line, of contact between the cutting tool and the tool holder that is parallel to the toolholder. These two points of contact allow a cutting tool to move or vibrate relative to the tool holder, creating chatter under certain conditions. This is due to the combined natural frequencies of the power drive unit, the cutting tool, and the tool holder and the harmonic nature of these elements when operating the cutting machine at various parameters. When the chatter occurs, minute particles of material are removed from either the shank or the sleeve member. These particles typically become embedded in one of the opposing mating surfaces of the shank or the sleeve member, normally in the shank because it is softer than the sleeve member, also commonly known as fretting.

The aforementioned tool and holder arrangement has another drawback. When tightening the setscrews against the flats, the center of the shank or cutting tool is often offset from the center of the sleeve member or tool holder.

What is needed is a tool and holder arrangement, which eliminates or minimizes vibration that results in chatter, and which results in less offset between the center of the cutting tool and the center of the tool holder.

SUMMARY OF THE INVENTION

Generally speaking, the invention is directed to a cutting tool that has a shank with a cylindrical portion that is adapted to fit equal to or more closely within a tool holder. The shank is adapted to be engaged by a setscrew of the tool holder at a first contact point. A clearance surface is provided opposite the first contact point. The clearance surface terminates adjacent two circumferentially spaced points that make contact with the tool holder upon tightening the setscrew. These contact points are circumferentially spaced from the first contact point angular distances greater than 90 degrees and less than 270 degrees.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
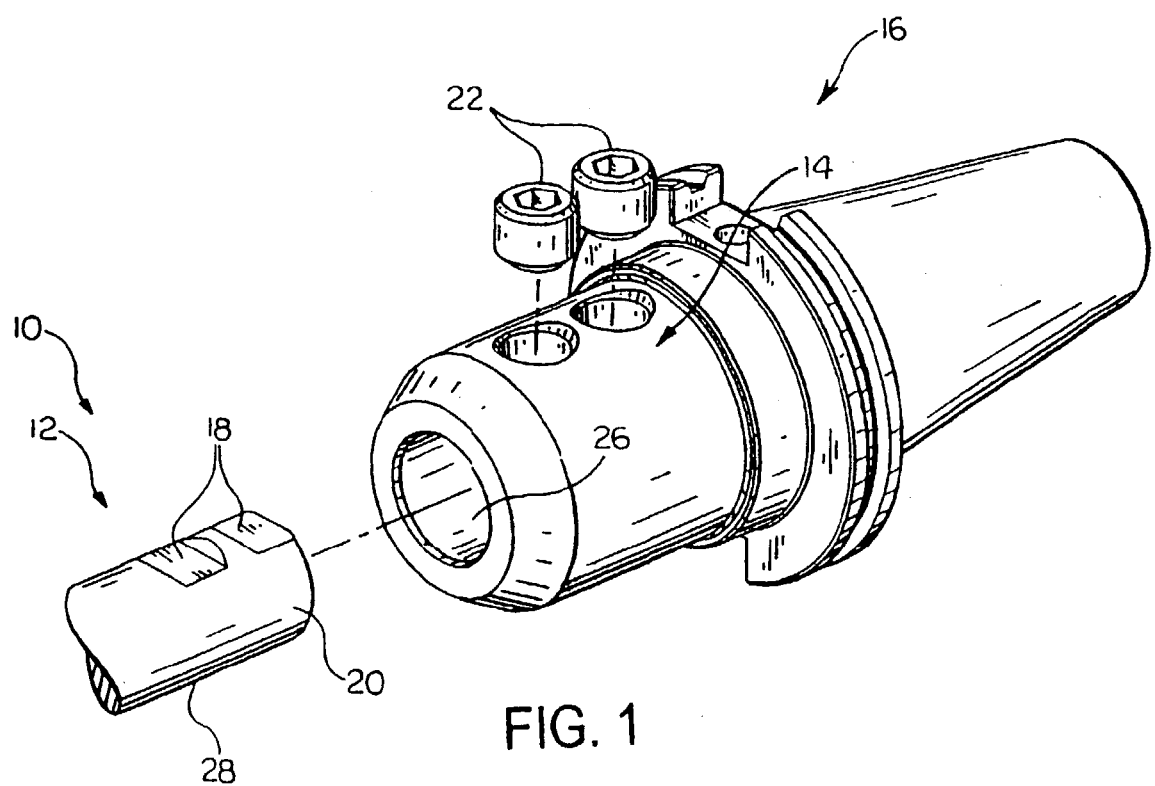
FIG. 1 is an exploded partial perspective view of a cutting tool shank according to one embodiment of the invention and a tool holder sleeve member.

With reference now to the drawings, wherein like numerals designate like components throughout all of the several figures, there is illustrated in FIG. 1 a cutting tool 10 according to one embodiment of the invention. The cutting tool 10 has a shank 12 that has one or more substantially cylindrical portions, or a predominantly cylindrical peripheral surface 20. The shank 12 has a specific diameter that mates with, fits closely within, or fits within a close tolerance (e.g., about 0.001 to about 0.005 inch) of a substantially cylindrical adapter or sleeve member 14 of a tool holder 16. The tool holder 16 is mounted to the spindle of a power drive unit (not shown) and is adapted to support the cutting tool 10 in order to connect the cutting tool 10 to the power drive unit.

The shank 12 may be provided with one or more flats 18, which may be machined, or otherwise provided, along one side of the peripheral surface 20 of the shank 12. In accordance with a preferred embodiment the invention, two flats 18 are arranged in axial alignment along the peripheral surface 20 of the shank 12, as shown in FIG. 1.

The sleeve member 14 supports a setscrew 22 for each flat 18. The setscrews 22 are adapted to be tightened against the flats 18, which cooperatively define a first contact point along one side of the shank 12. The force of each setscrew 22 is transmitted to the shank 12. This force causes portions 24 of the shank 12 (i.e., lower portions of the shank 12 when viewing FIG. 1) to meet or engage an inner surface 26 of the sleeve member 14 to secure the shank 12 in the sleeve member 14. These portions 24 define second and third contact points, which are each preferably circumferentially spaced angular distances from the flats 18, or the first contact point. In a preferred embodiment of the invention, the second and third contact points are spaced from the flats 18, or the first contact point, angular distances greater than 90 degrees and less than 270 degrees. The second and third contact points are most preferably spaced 120 degrees from the first contact point.

Figure 2:
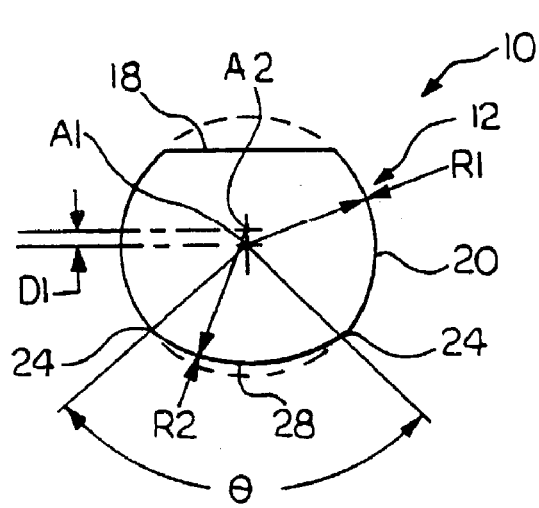
FIG. 2 is a cross-sectional view of the cutting tool shank taken along the line 2—2 in FIG. 1.
Figure 3:
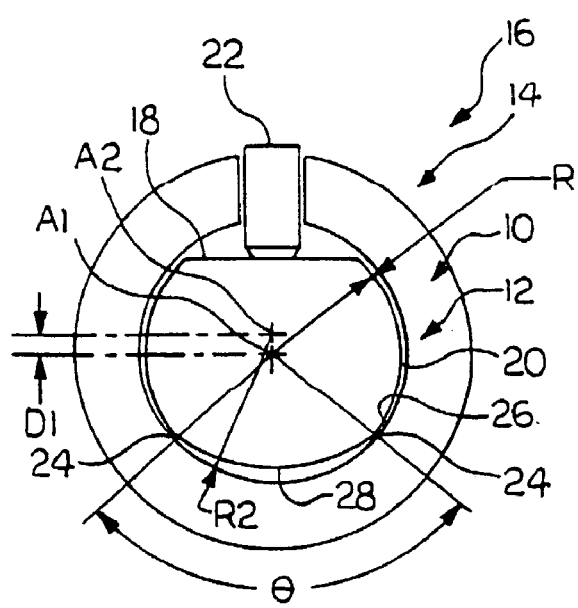
FIG. 3 is a cross-sectional view of the shank held within the tool holder sleeve member.

Now, with reference to FIGS. 2 and 3, the peripheral surface 20 of the shank 12 has a radius R1, which has a focal point that is coincident with the longitudinal axis A1 of the shank 12, or the cutting tool 10. The flats 18 are provided along one side or portion of the peripheral surface 20 of the shank 12. In accordance with a preferred embodiment of the invention, a portion 28 (e.g., a relief or clearance surface) of the shank 12 along the entire length thereof, opposite the flats 18, or along another side of the peripheral surface 20 (i.e., a bottom portion of the shank 12 when viewing FIG. 2), has an enlarged radius R2. The enlarged radius R2 has a focal point A2 that is offset relative to the longitudinal axis A1 of the shank 12. The focal point A2 of the enlarged radius R2 is shown closer to the flat 18 than the axis A1 of the shank 12. The size of the enlarged radius R2 and the position of its focal point A2 provide a clearance represented by the distance D1, which is the distance between the radius R1 of the peripheral surface 20 of the shank 12 and the enlarged radius R2. The enlarged radius portion 28 terminates proximate or adjacent the portions 24 of the shank 12 that engage or contact the inner surface 26 of the sleeve member 14. Consequently, the size of the enlarged radius R2 and the position of its focal point A2 also dictate the angular distance, which represented by the angle θ, between the portions 24 of the shank 12 that engage or contact the inner surface 26 of the sleeve member 14. This angle θ is greater than 0 degrees but less than 180 degrees, and is most preferably, about 120 degrees. This results in three points of contact, preferably space equidistantly (i.e., about 120 degrees apart), one of the points of contact being where the setscrews 22 engage the flats 18 and the other two points of contact being where the portions 24 of the shank 12 engage an inner surface 26 of the sleeve member 14.

The aforementioned cutting tool 10, when used in cooperation with the aforementioned sleeve member 14, eliminates or minimizes vibration that results in chatter. Moreover, the relief or clearance surface (i.e., portion 28) permits the shank 12 to be dimensioned to fit more closely within the sleeve member 14 than conventional or known shanks. Consequently, the present invention results in less runout, or offset between the center of the cutting tool 10 and the center of the tool holder 16.

Figure 4:
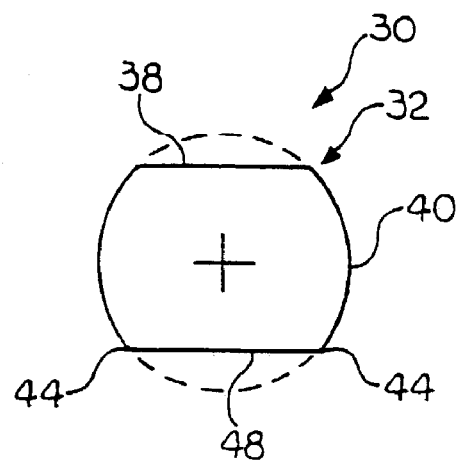
FIG. 4 is a cross-sectional view of a cutting tool shank according to another embodiment of the invention.
Figure 5:
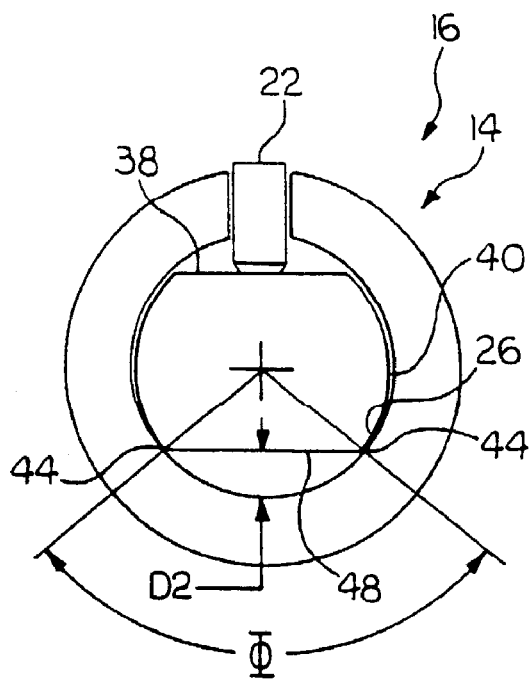
FIG. 5 is a cross-sectional view of the shank illustrated in FIG. 4 held within the tool holder sleeve member.

A cutting tool 30 according to an alternative embodiment of the invention is illustrated in FIGS. 4 and 5. This cutting tool 30 has a shank 32 that has one or more substantially cylindrical portions, or a predominantly cylindrical peripheral surface 40, similar to the cutting tool 10 described above. The shank 32 has a specific diameter that mates with, fits closely within, or fits within a close tolerance (e.g., about 0.001 to about 0.005 inch) of the sleeve member 14 of a tool holder 16. The tool holder 16 is mounted to the spindle of a power drive unit (not shown) and is adapted to support the cutting tool 30 in order to connect the cutting tool 30 to the power drive unit.

The shank 32 may be provided with one of more flats 38, which may be machined, or otherwise provided, along one side of the peripheral surface 40 of the shank 32. In accordance with a preferred embodiment the invention, two flats 38 are arranged in axial alignment along the peripheral surface 40 of the shank 32, similar to that of the shank 12 described above.

The sleeve member 14 supports a setscrew 22 for each flat 38. The setscrews 22 are adapted to be tightened against the flats 38, which cooperatively define a first contact point along one side of the shank 12. The force of each setscrew 22 is transmitted to the shank 32. This force causes portions 44 of the shank 32 opposite the flats 38 (i.e., lower portions of the shank 32 when viewing FIGS. 4 and 5) to meet or engage the inner surface 26 of the sleeve member 14 to secure the shank 32 in the sleeve member 14. These portions 44 define second and third contact points, which are each preferably circumferentially spaced angular distances from the flats 38, or the first contact point. In a preferred embodiment of the invention, the second and third contact points are spaced from the flats 38, or the first contact point, angular distances greater than 90 degrees and less than 270 degrees. The second and third contact points are most preferably spaced 120 degrees from the first contact point.

In accordance with this embodiment of the invention, the flats 38 are provided along one side or portion of the peripheral surface 40 of the shank 32. A portion (e.g., a relief or clearance surface) of the shank 32 opposite the flats 38, or along another side or portion of the peripheral surface 40 (i.e., a bottom portion of the shank 32 when viewing FIG. 4), has one or more facets 48 (only one shown) along the entire length of the shank. The depth and location of the facet 48 provides clearance, which is measured by a distance D2, between the facet 48 and the inner surface 26 of the sleeve member 14. The facet 48 terminates proximate or adjacent the portions 44 of the shank 32 that engage or contact the inner surface 26 of the sleeve member 14. Consequently, the size and location of the facet 48 dictates the angular distance, which represented by the angle Φ, between the portions 44 of the shank 32 that engage an inner surface 26 of the sleeve member 14. This angle Φ is greater than 0 degrees but less than 180 degrees, and is most preferably, about 120 degrees. This results in three points of contact, preferably space equidistantly (i.e., about 120 degrees apart), one of the points of contact being where the setscrews 22 engage the flats 38 and the other two points of contact being where the portions 44 of the shank 32 engage an inner surface 26 of the sleeve member 14.

The immediately preceding cutting tool 30, when used in cooperation with the aforementioned sleeve member 14, eliminates or minimizes vibration that results in chatter. Moreover, the relief or clearance surface (i.e., portion 48) permits the shank 32 to be dimensioned to fit equal to or more closely within the sleeve member 14 than conventional or known shanks. Consequently, the present invention should result in less runout, or offset between the center of the cutting tool 30 and the center of the tool holder 16.

It should be appreciated that in both of the aforementioned embodiments, the depth of the relief or clearance surfaces is minimized so that the integrity of the shank 12, 32 is not compromised.

While the invention has been described with respect to several preferred embodiments, various modifications and additions will become apparent to persons of ordinary skill in the art. All such modifications and additions are intended to be encompassed within the scope of this patent, which is limited only by the claims appended hereto.

What is claimed is:

1. A cutting tool comprising:
    a shank having a longitudinal axis that is adapted to fit within a tool holder, the shank including,
    a cylindrical portion including a radius having a focal point that is coincident with the longitudinal axis of the shank,
    a flat formed within the cylindrical portion that is adapted to be engaged by a setscrew of the tool holder, and
    a curvilinear clearance surface opposite of the flat, the curvilinear clearance surface having a radius with a focal point that is offset relative to the longitudinal axis of the shank, wherein the clearance surface contacts the tool holder upon tightening of the setscrew at at least two contact points such that the at least two contact points are circumferentially spaced from the flat at angular distances greater than 90 degrees and less than 270 degrees.

2. The cutting tool of claim 1 wherein the contact points are circumferentially spaced from the flat equal angular distances of about 120 degrees.

3. A cutting tool comprising:
a shank having a longitudinal axis, a cylindrical portion having a first radius with a focal point that is coincident with the longitudinal axis, a first contact point in a peripheral surface of the shank, and a curvilinear clearance surface having an enlarged radius circumferentially opposite the first contact point, the enlarged radius having a focal point that is offset front the longitudinal axis of the shank so as to provide a curvilinear clearance surface on the shank, the curvilinear clearance surface terminating adjacent circumferentially spaced, second and third contact points, the second and third contact points further being circumferentially spaced from the first contact point angular distances greater than 90 degrees and less than 270 degrees.

4. The cutting tool of claim 3 wherein the contact points are circumferentially spaced from the flat equal angular distances of about 120 degrees.

5. In combination:
a tool holder mounted to a cutting machine power drive unit, the tool holder having a sleeve member that supports one or more setscrews, the sleeve member having a cylindrical inner surface; and a cutting tool supported by the tool holder, the cutting tool having a shank, the shank having a specific diameter that is adapted to fit within a close tolerance in a tool holder sleeve member, the shank further having one of more flats along a peripheral surface thereof, the setscrews being adapted to be tightened against the flats to cause portions of the shank opposite the flats to engage the inner surface of the sleeve member to secure the shank in the sleeve member, the shank further having a curvilinear clearance surface between the portions, the portions being spaced from the first contact point angular distances less than 270 degrees and greater than 90 degrees.

6. The cutting tool of claim 5 wherein the contact points are circumferentially spaced from the flat equal angular distances of about 120 degrees.

* * * * *